(12) United States Patent
Bower, III et al.

(10) Patent No.: US 12,248,619 B2
(45) Date of Patent: Mar. 11, 2025

(54) DISABLING A TAMPER-PREVENTION OPERATION OF AN EDGE DEVICE IN RESPONSE TO DETECTION OF AN AUTHORIZED PERSON

(71) Applicant: Lenovo Global Technology (United States) Inc., Morrisville, NC (US)

(72) Inventors: Fred Allison Bower, III, Durham, NC (US); Caihong Zhang, Shanghai (CN); Ming Lei, Shanghai (CN)

( * ) Notice: Subject to any disclaimer, the term of this patent is extended or adjusted under 35 U.S.C. 154(b) by 333 days.

(21) Appl. No.: 17/706,374

(22) Filed: Mar. 28, 2022

(65) Prior Publication Data

US 2023/0306143 A1 Sep. 28, 2023

(51) Int. Cl.
| | | |
|---|---|---|
| G06F 21/88 | (2013.01) | |
| G06F 21/31 | (2013.01) | |
| G06F 21/86 | (2013.01) | |
| G07C 9/28 | (2020.01) | |
| G07C 9/00 | (2020.01) | |
| H04W 12/06 | (2021.01) | |

(52) U.S. Cl.
CPC ............... G06F 21/86 (2013.01); G07C 9/28 (2020.01)

(58) Field of Classification Search
None
See application file for complete search history.

(56) References Cited

U.S. PATENT DOCUMENTS

| | | | | |
|---|---|---|---|---|
| 4,218,763 A * | 8/1980 | Kelley | ............. | G08B 13/00 455/99 |
| 10,706,703 B1 * | 7/2020 | Barr | ............. | G08B 13/08 |
| 2012/0226601 A1 * | 9/2012 | Cole | ............. | G06Q 40/00 705/35 |
| 2013/0311791 A1 * | 11/2013 | Falk | ............. | G05B 19/0425 713/194 |
| 2014/0143881 A1 * | 5/2014 | Boday | ............. | G06F 21/87 726/26 |
| 2016/0019736 A1 * | 1/2016 | Radicella | ............. | G07C 9/00571 235/382 |
| 2022/0075906 A1 * | 3/2022 | Ahmed | ............. | G06F 21/87 |
| 2022/0189230 A1 * | 6/2022 | Radicella | ............. | G07C 9/27 |

\* cited by examiner

*Primary Examiner* — Venkat Perungavoor
(74) *Attorney, Agent, or Firm* — Jeffrey L. Streets

(57) ABSTRACT

A computer program product includes a non-transitory computer readable medium and program instructions embodied therein. An apparatus includes a non-transitory data storage device storing program instructions and at least one processor configured to process the program instructions. The program instructions are configured to, when processed by the at least one processor, cause the apparatus to perform various operations. The operations may include monitoring a tamper-detection sensor of an edge device, wherein the edge device performs a tamper-prevention operation in response to an output signal from the tamper-detection sensor. The operations may further include detecting entry of an authorized person into a facility where the edge device is located and automatically sending a disabling instruction to the edge device to cause the edge device to temporarily disable the tamper-prevention operation of the edge device in response to detecting entry of the authorized person into the facility.

20 Claims, 6 Drawing Sheets

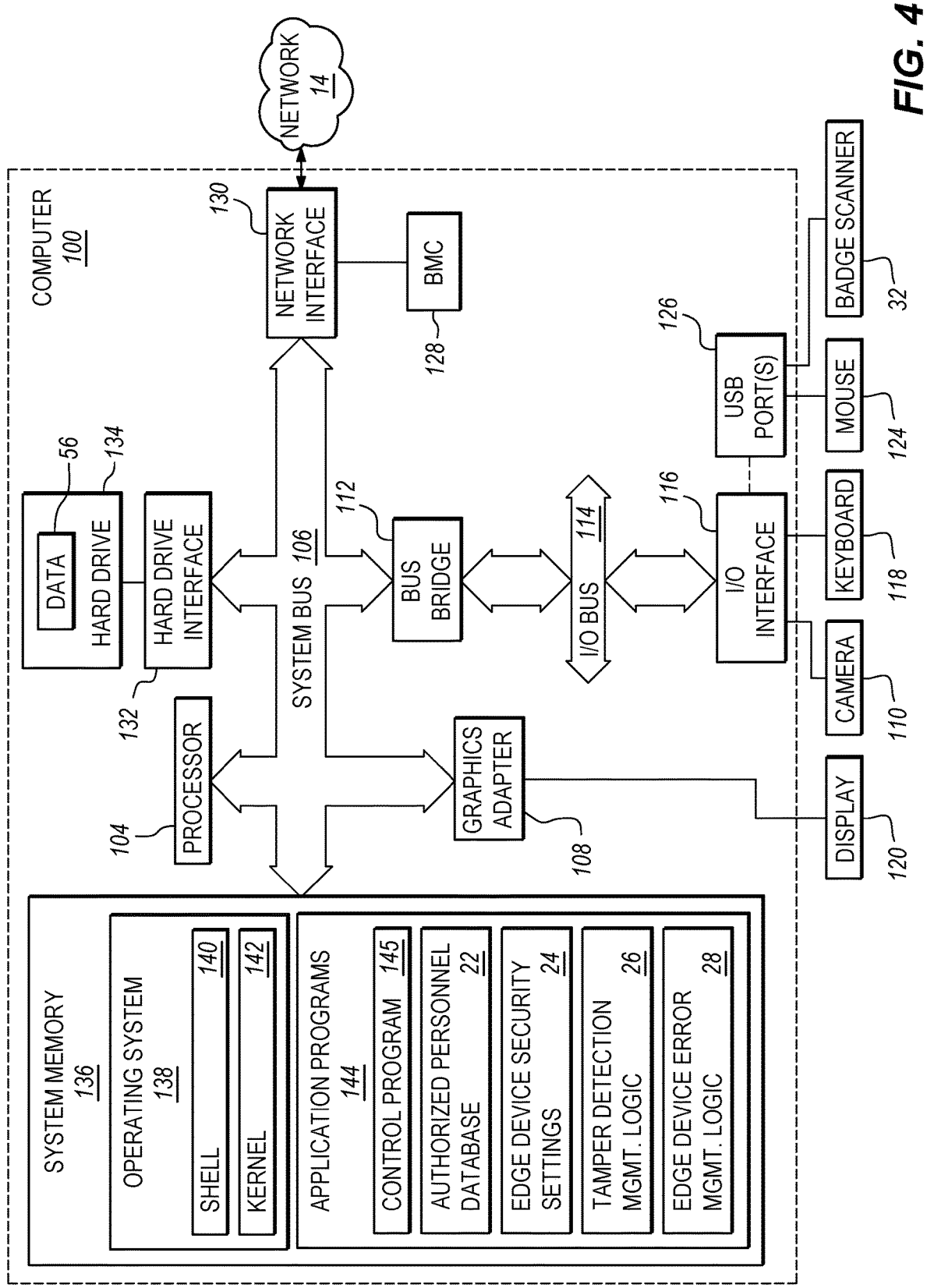

DISABLING A TAMPER-PREVENTION OPERATION OF AN EDGE DEVICE IN RESPONSE TO DETECTION OF AN AUTHORIZED PERSON

BACKGROUND

The present disclosure relates to methods and apparatus for detecting or preventing tampering with an edge device.

BACKGROUND OF THE RELATED ART

In high-security and edge deployments, it is common to have tamper-detection sensors built into computer equipment. Examples of such tamper-detection sensors include motion sensors, global positioning system (GPS) receivers, and switches to detect the opening of a panel or cover that allows access to a component. However, when an authorized person attempts to service this equipment, the person will typically trigger the tamper-detection sensors and have to manually reset them in order to restore the equipment to full operation. For example, triggering the tamper-detection sensors might cause the device power to be automatically shut off or might cause a device data storage drive to be automatically locked.

BRIEF SUMMARY

Some embodiments provide a computer program product comprising a non-volatile computer readable medium and non-transitory program instructions embodied therein, wherein the program instructions are configured to be executable by a processor to cause the processor to perform various operations. The operations may include monitoring a tamper-detection sensor of an edge device, wherein the edge device performs a tamper-prevention operation in response to an output signal from the tamper-detection sensor. The operations may further include detecting entry of an authorized person into a facility where the edge device is located and automatically sending a disabling instruction to the edge device to cause the edge device to temporarily disable the tamper-prevention operation of the edge device in response to detecting entry of the authorized person into the facility where the edge device is located.

Some embodiments provide an apparatus including at least one non-transitory data storage device storing program instructions and at least one processor configured to process the program instructions, wherein the program instructions are configured to, when processed by the at least one processor, cause the apparatus to perform various operations. The operations may include monitoring a tamper-detection sensor of an edge device, wherein the edge device performs a tamper-prevention operation in response to an output signal from the tamper-detection sensor. The operations may further include detecting entry of an authorized person into a facility where the edge device is located and automatically sending a disabling instruction to the edge device to cause the edge device to temporarily disable the tamper-prevention operation of the edge device in response to detecting entry of the authorized person into the facility where the edge device is located.

BRIEF DESCRIPTION OF THE SEVERAL VIEWS OF THE DRAWINGS

FIG. 4 is a diagram of a computer that may be representative of the edge management system and/or an edge device according to yet another embodiment.

DETAILED DESCRIPTION

Figure 1:
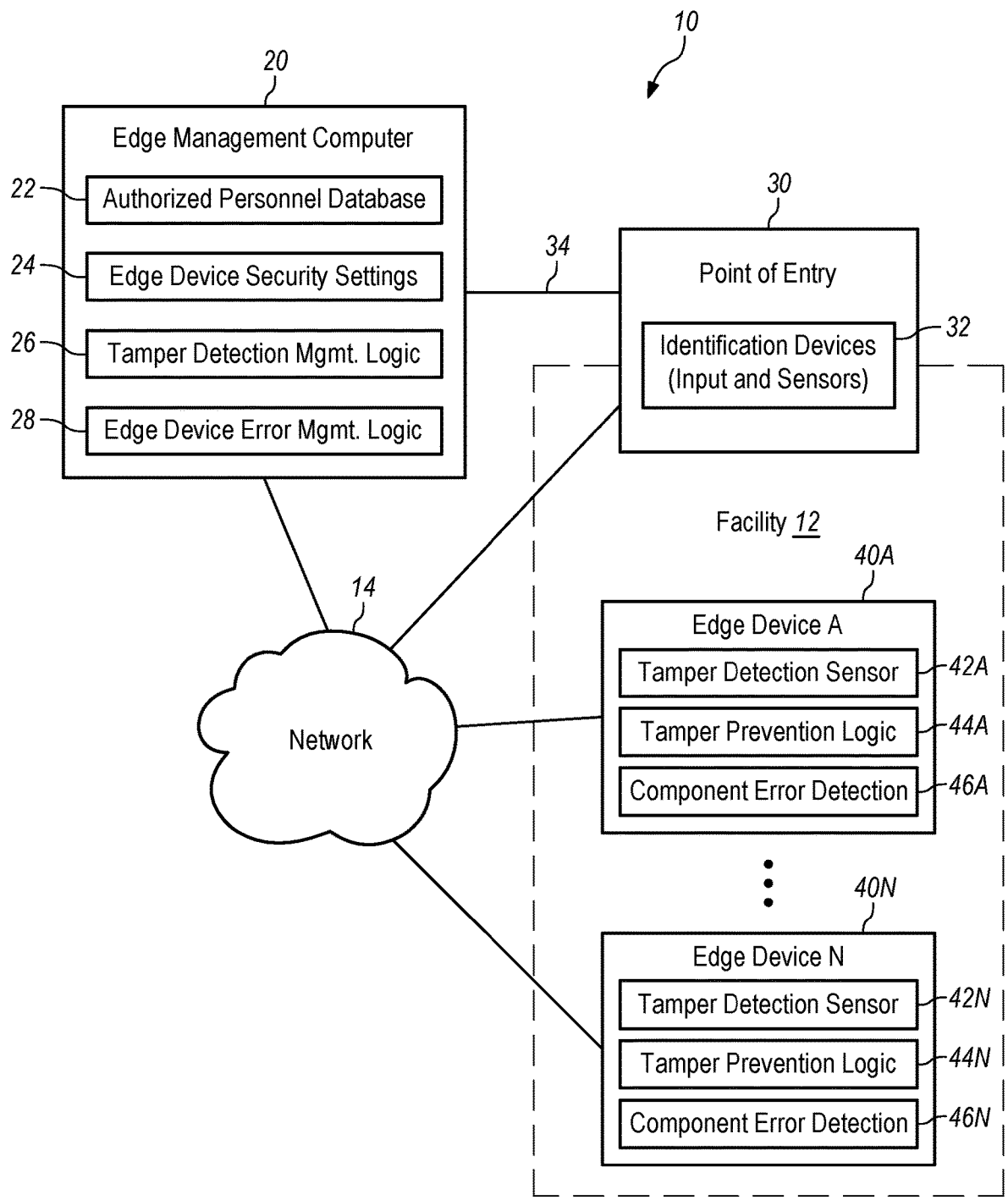
FIG. 1 is a diagram of a system including an edge management system and a plurality of edge devices.

Some embodiments provide a computer program product comprising a non-volatile computer readable medium and non-transitory program instructions embodied therein, wherein the program instructions are configured to be executable by a processor to cause the processor to perform various operations. The operations may include monitoring a tamper-detection sensor of an edge device, wherein the edge device performs a tamper-prevention operation in response to an output signal from the tamper-detection sensor. The operations may further include detecting entry of an authorized person into a facility where the edge device is located, and automatically sending a disabling instruction to the edge device to cause the edge device to temporarily disable the tamper-prevention operation of the edge device in response to detecting entry of the authorized person into the facility where the edge device is located.

An edge management system may include the processor and the non-volatile computer readable medium having the program instructions of the compute program product embodied therein. Accordingly, the edge management system may perform the operations described herein. The edge management system is a computer that is in communication with one or more edge devices. The communication between the edge management system may be transmitted over a direct connection, such as a peripheral component interconnect express (PCIe) connection, or a network connection, such as a local area network (LAN) connection or a wide area network (WAN) connection. Furthermore, the communication between the edge management system may be transmitted over a wired or wireless connection.

The edge device may be any of a variety of devices that operate at the edge of a network. Non-limiting examples of an edge device include an edge router, routing switch, firewall, multiplexer, computer and any other wide area network (WAN) device. These and other edge devices may have built-in processors with onboard analytics or artificial intelligence capabilities. Some edge devices may be Internet of Things (IoT) devices and include sensors, actuators, and/or IoT gateways. The edge devices may be deployed for any suitable purpose, such as edge computing, process control, and systems monitoring.

Embodiments of the edge device may include one or more tamper-detection sensors, such as a motion detector and/or an intrusion detector. For example, the tamper-detection sensor may be a motion detector integrated into the edge device to detect movement of the edge device. Such a motion detector may be an accelerometer, gyroscope or gravity sensor that produces a signal when movement of the edge device is detected. Movement may include dropping the edge device, changing the orientation of a chassis containing the edge device, shaking the edge device, and/or changing the location of the edge device. In another example, the tamper-detection sensor may be a physical intrusion sensor integrated into the edge device to detect opening of a chassis containing one or more components of the edge device. Such a physical intrusion sensor may be a physical or optical switch that produces a signal when a chassis containing the edge device is opened.

Embodiments of the edge device may further implement a tamper-prevention mechanism or operation. For example, the edge device may be an edge computer including a self-encrypting data storage device, and the tamper-prevention operation may include locking the self-encrypting data storage device in response to a signal from the tamper-detection sensor that indicates a prohibited motion or intrusion or a prohibited level of motion or intrusion. In some embodiments, the disabling instruction may command the edge device to temporarily disable the tamper-prevention operation of the edge device for a predetermined period of time. Accordingly, the edge device may automatically enable the tamper-prevention operation in response to expiration of the predetermined period of time.

In some embodiments, the facility may be a data center, any structure housing information technology infrastructure, residence, office, business, manufacturing or production plant, distribution center, and the like. Entry into the facility may be through a gate, entryway, door, area of the facility, or security checkpoint. The authorized person is a person that is authorized to enter the facility, service and/or otherwise access the edge device. For example, in a production plant, the edge device may be an edge computer that controls various units of process equipment and stores process data collected from various process sensors associated with the process equipment. Accordingly, the authorized person may be an employee or contractor of a company that owns and/or operates the production plant (facility) and the authorized person may carry an identification badge with an optically scannable Quick Response (QR) code, a Radio Frequency Identification Device (RFID), or an encoded magnetic strip that can identify the person entering the facility and verify that they are authorized to service and/or access the edge device. Optionally, the authorized person may be authorized to service and/or access certain edge devices or types of edge devices in the facility but may not be authorized to service and/or access other edge devices or types of edge devices in the facility. In implementations where the facility includes a plurality of edge devices and the authorized person entering the facility is authorized to service and/or access more than one of the edge devices, the disabling instruction may be sent to each of the edge devices that the authorized person is authorized to service and/or access. If the authorized person is authorized to service all edge device in the facility, then the operations may include broadcasting a disabling instruction to each of the edge devices.

In some embodiments, the operation of detecting entry of the authorized person into the facility where the edge device is located may include detecting an identification badge of the authorized person. In some embodiments, the operation of detecting entry of the authorized person into the facility where the edge device is located may include receiving biometric input associated with the authorized person. Non-limiting examples of biometric input include facial recognition, retina scans, and/or fingerprint detection.

In some embodiments, the tamper-prevention operation of the edge device may include automatically preventing use of one or more component of the edge device in response to receiving an output signal from the tamper-detection sensor of the edge device that indicates tampering with the edge device. In other embodiments, the tamper-prevention operation of the edge device may include performing a predetermined action to limit access to data stored by the edge device in response to an output signal from the tamper-detection sensor of the edge device indicating tampering with the edge device. For example, the predetermined action may be selected from triggering an automatic shutdown of the edge device, automatically disabling of a baseboard management controller (BMC) network bridge through Up Link Ports, and/or automatically disabling the baseboard management controller network bridge through Wi-Fi Ports. In one option, the operations may further include receiving user input designating a motion sensitivity level for the edge device and sending a setup instruction to the edge device to cause the edge device to implement the motion sensitivity level as a threshold for determining whether the output signal from the tamper-detection sensor on the edge device indicates tampering with the edge device. In another option, the operations may further include receiving user input designating a chassis orientation for the edge device and sending a setup instruction to the edge device to cause the edge device to implement the chassis orientation as a configuration for determining whether the output signal from the tamper-detection sensor on the edge device indicates tampering with the edge device.

In some embodiments, the operations may further include detecting exit of the authorized person from the facility where the edge device is located and automatically sending an enabling instruction to the edge device to enable the tamper-prevention operation of the edge device in response to detecting exit of the authorized person. Accordingly, the tamper-prevention operation may be enabled as soon as the authorized person leaves the facility. In another embodiment, the operations may further include detecting completion of a service activity on the edge device and automatically sending an enabling instruction to the edge device to enable the tamper-prevention operation of the edge device in response to detecting completion of a service activity on the edge device. Therefore, the tamper-prevention operation may be enabled as soon as the service activity is completed regardless of whether the authorized person has exited the facility. In a further embodiment, the operations may further include detecting expiration of a predetermined timeout period since disabling the tamper-prevention operation of the edge device and automatically sending an enabling instruction to the edge device to enable the tamper-prevention operation of the edge device in response to detecting expiration of the predetermined timeout period.

Some embodiments may further include the operations of receiving a service alert from the edge device and sending a service request to the authorized person to perform a service task on the edge device in response to receiving the service alert. In one option, the facility may include a plurality of edge devices, and the disabling instruction may be sent only to the edge device from which the service alert was received.

Some embodiments provide an apparatus including at least one non-transitory data storage device storing program instructions and at least one processor configured to process the program instructions, wherein the program instructions are configured to, when processed by the at least one processor, cause the apparatus to perform various operations. The operations may include monitoring a tamper-detection sensor of an edge device, wherein the edge device performs a tamper-prevention operation in response to an output signal from the tamper-detection sensor. The operations may further include detecting entry of an authorized person into a facility where the edge device is located and automatically sending a disabling instruction to the edge device to cause the edge device to temporarily disable the tamper-prevention operation of the edge device in response to detecting entry of the authorized person into the facility where the edge device is located. Furthermore, apparatus and method embodiments may include any one or more operation described in the reference to the computer program product embodiments.

In some embodiments, a user interface may allow a system administrator to enable and/or disable a tamper-prevention operation. In one option, if a tamper-prevention operation is enabled and the edge device includes a motion detection sensor, then the system administrator may further designate a motion sensitivity level and/or a chassis orientation that will trigger the tamper-prevention operation. Furthermore, the user interface may allow the system administrator to select one or more tamper-prevention operations to be taken in response to receiving a signal from the tamper-detection sensor.

In embodiments where the edge sensor includes an accelerometer, the accelerometer sensitivity to be used in detection a motion event may be expressed in gal/ms (units of galileo per millisecond). Optionally, the user interface may enable the system administrator to select from predetermined accelerometer sensitivity threshold, such as a low sensitivity threshold that would detect shaking, a fall or rolling (about 500 gal/100 ms), a medium sensitivity threshold that would detect stealing or movement (about 250 gal/300 ms), and a high sensitivity threshold that would detect vibration or a magnitude 5 earthquake (about 250 gal/100 ms).

FIG. 1 is a diagram of a system 10 including an edge management computer 20 and a plurality of edge devices 40A-40N within a facility 12. The edge management computer 20 may communicate with the edge devices 40A-40N over a network 14. Furthermore, the edge management computer 20 may communicate with one or more identification devices 32 via a direct connection 34, such as a Universal Serial Bus (USB) connection, or via the network 14. The one or more identification devices 32 may be located at a point of entry 30 to the facility 12 in order to collect input regarding personnel entering and exiting the facility 12. For example, the one or more identification devices 32 may include a fingerprint scanner for supporting fingerprint recognition, camera for supporting facial recognition, microphone for supporting voice recognition, retina or iris scanner for supporting retina or iris recognition, and other sensors for similarly identifying a person attempting to enter the facility.

The edge management computer 20 includes an authorized personnel database 22, edge device security settings 24, tamper detection management logic 26, and edge device error management logic 28. The authorized personnel database 22 may store one or more records that may be used to identify personnel that are authorized (i.e., one or more "authorized person") to physically service and/or physically access the edge devices 40A-40N. A particular person entering the facility 12 may be identified by comparing input received from the one or more identification devices 32 with the one or more records in the authorized personnel database 22. If the input received from the one or more identification device 32 matches one of the records in the authorized personnel database 22, then the particular person is determined to be an authorized person. For example, the authorized personnel database 22 may include a plurality of records, where each record including information about a particular authorized person. The record for each authorized person may include one or more of the authorized person's name, employee or badge identification code, fingerprint data, facial image data, voice characterization data, retina or iris image data, or other data for comparison with input received from the one or more identification devices 32.

The edge device security settings 24 may identify each of the edge devices 40A-40N and identify, for each edge device, the type of tamper detection sensor(s) installed on the edge device, the level of signal from the tamper detection sensor(s) required to trigger a tamper prevention operation, and/or a subset of the personnel in the authorized personnel database 22 that may physically service and/or physically access the edge device.

The tamper detection management logic 26 may be performed by the edge management computer 20 to control one or more operations of the edge management computer 20. In some embodiments, the tamper detection management logic 26 may perform identification and/or authentication of a person attempting entry into the facility, such as performing a fingerprint recognition process, facial recognition process, voice recognition process, retina or iris recognition process, or similar personnel identification process. These processes may involve a comparison of input received from one or more of the identification devices 32 with data in one or more records of the authorized personnel database 22. Furthermore, the tamper detection management logic 26 may cause the edge management computer 20 to send a disabling instruction to an edge device to cause the edge device to temporarily disable a tamper-prevention operation of the edge device. For example, the tamper detection management logic 26 may cause the edge management computer 20 to send the disabling instruction in response to detecting entry of an authorized person into the facility where the edge device is located. In some embodiments, the tamper detection management logic 26 may cause the edge management computer 20 to send an enabling instruction to the edge device to enable a tamper-prevention operation of the edge device in response to detecting that the authorized person is exiting the facility.

The edge device error management logic 28 may be performed by the edge management computer 20 to control one or more operations of the edge management computer 20. In some embodiments, the edge device error management logic 28 may cause the edge management computer 20 to send service notifications to an authorized person in response to receiving an error message from one or more of the edge devices 40A-40N. Furthermore, the edge device error management logic 28 may keep a log of error messages and the edge device that sent each error message. In one option, the tamper detection management logic 26 may be setup to only disable tamper prevention operations for those edge devices that have sent an error message (i.e., as evidenced by the log of error messages) yet to be resolved via service by an authorized person.

Each of the edge devices 40A-40N may include a tamper detection sensor 42A-42N, tamper prevention logic 44A-44N, and/or component error detection logic 46A-46N. As previously discussed, the tamper detection sensor(s) 42A-42N may include a motion sensor and/or an intrusion sensor.

The tamper prevention logic 44A-44N may be executed by the edge device 40A-40N to cause the edge device to perform a tamper prevention operation in response to an output signal from the tamper detection sensor(s) 42A-42N. In some options, each edge device 40A-40N may automatically perform the tamper prevention logic 44A-44N in response to output signal from the tamper detection sensor(s) 42A-42N. Accordingly, as long as the edge management computer 20 has not sent a disabling instruction to the edge device, the edge device will perform the tamper prevention operation or logic without relying upon, or waiting for, an instruction from the edge management computer 20. In some options, one or more aspect of the tamper prevention logic may be included in the tamper detection management logic 26 of the edge management computer 20, such that an edge device will not perform the tamper prevention operation unless and until receiving a tamper prevention instruction from the edge management computer 20.

The component error detection logic 46A-46N of each edge device 40A-40N may include error detection and reporting. For example, if the edge device experiences an error, the error detection logic 46A-46N may detect the error and report the error to the edge management computer 20.

Figure 2:
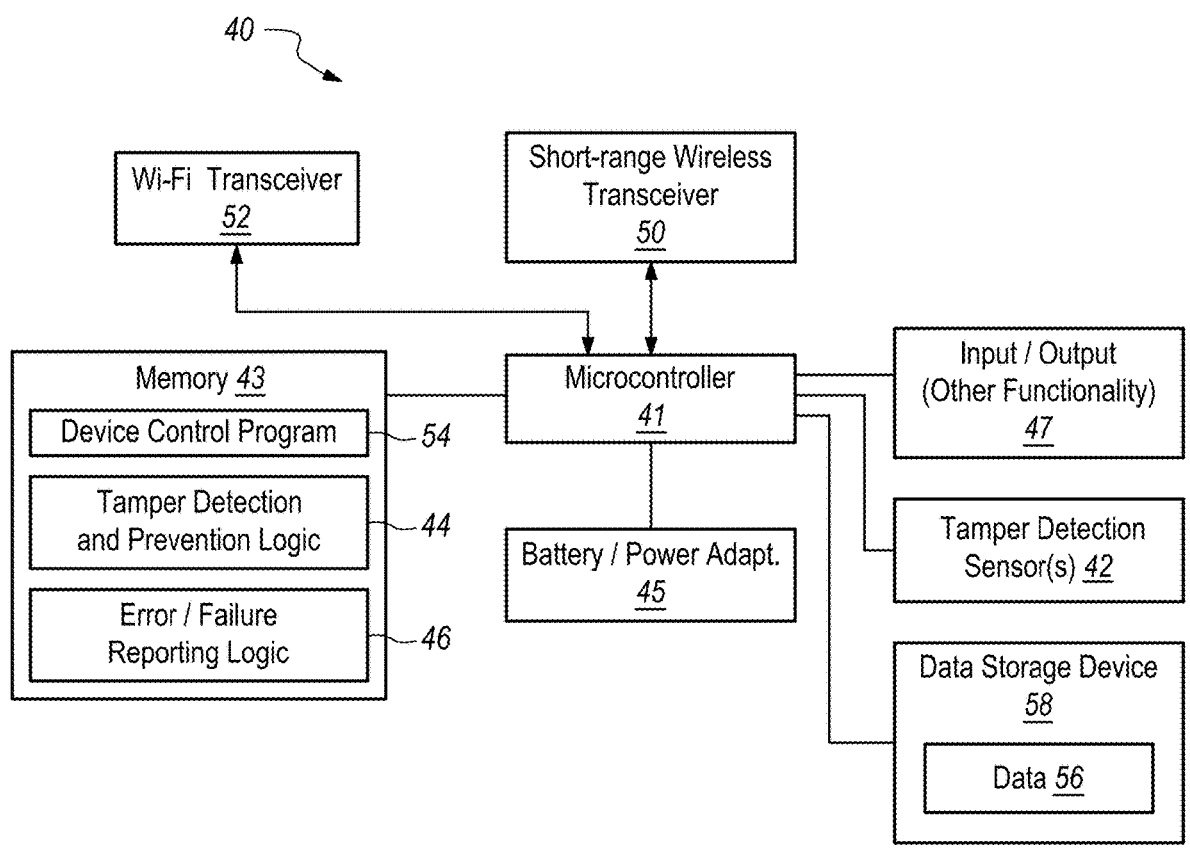
FIG. 2 is a diagram of an edge device according to one embodiment.

FIG. 2 is a diagram of an edge device 40 according to one embodiment. The edge device 40 may include a microcontroller/processor 41, memory 43, a battery 45 or other power source, a short-range wireless transceiver 50 (perhaps Bluetooth), a Wi-Fi transceiver 52, and an input/output component(s) 47 (i.e., a sensor or motor) or other functionality. The battery/power source 45 provides power to each of the other components. The microcontroller/processor 41 may access the memory 43 to read and/or write data and/or program instructions and may control use of the short-range wireless transceiver 50, the Wi-Fi transceiver 52, and the input/output component(s) 47.

Depending upon the task performed by the edge device 40, the memory 43 may include a device control program 54 including program instructions that may be executed by the microcontroller 41 to cause the performance of various operations. The memory 43 may also store tamper detection and prevention logic 44 that causes the microcontroller 41 to receive input from the tamper detection sensor(s) and execute a tamper prevention operation. Furthermore, the memory may include error/failure reporting logic 46 that causes the microcontroller 41 to report errors or failures to the edge management computer 20 in FIG. 1.

In one option, the microcontroller 41 executes the device control program 54 to control the operation of an input/output component, such as one or more sensors and/or one or more motors, and may store operational data 56, such as operating conditions, in a data storage device 58. When the tamper detection and prevention logic 44 detects tampering in the form of a signal output by the tamper detection sensor(s) 42, then the tamper detection and prevention logic 44 may perform a tamper prevention operation, such as locking the data storage device 58 or encrypting the data 56. With the data storage device 58 locked or the data 56 encrypted, any unauthorized person will be prevented from gaining access to the data 56. Optionally, the edge device 40 may perform fingerprint recognition, facial recognition, voice recognition, and/or retina or iris recognition using additional sensor components or equipment in order to perform the security check and determine whether a person accessing the edge device 40 is an authorized person.

Figure 3:
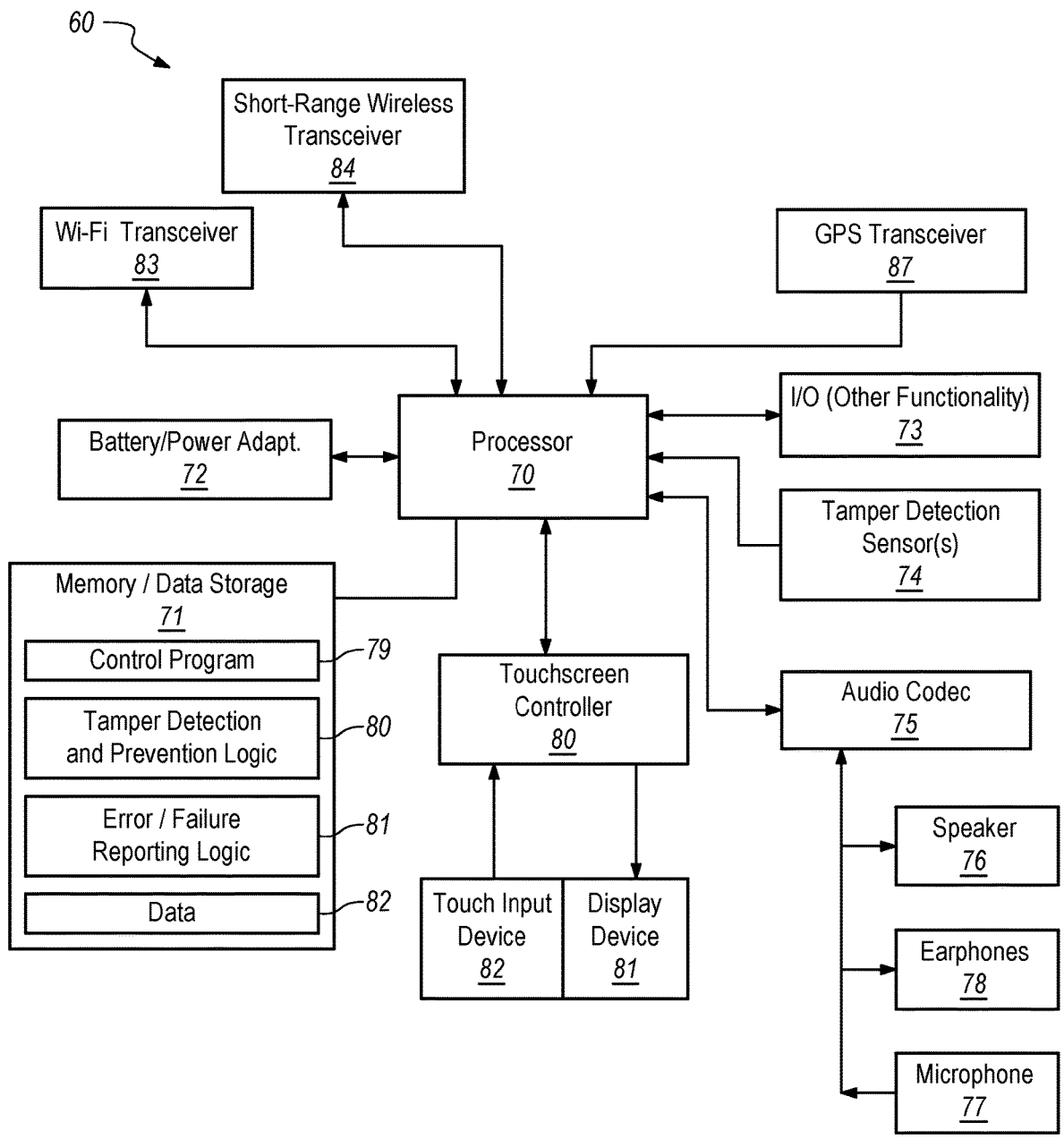
FIG. 3 is a diagram of an edge device according to another embodiment.

FIG. 3 is a diagram of an edge device 60 according to another embodiment. The edge device 60 may include a processor 70, memory or data storage device 71, a battery (or other power source) 72, an input/output device or other functionality 73, tamper detection sensor(s) 74, and an audio codec 75 coupled to a built-in speaker 76, a microphone 77, and an earphone jack or transceiver 78. The edge device 60 may further include a touchscreen controller 80 which provides a graphical output to the display device 81 and an input from a touch input device 82. Collectively, the display device 81 and touch input device 82 may be referred to as a touchscreen.

The edge device 60 may also include a short-range wireless transceiver 84, a wireless local area network transceiver ("Wi-Fi transceiver") 83, and a global positioning system (GPS) transceiver 87. Accordingly, the Wi-Fi transceiver 83 enables the formation of a wireless local area network connection to the network 14 of FIG. 1.

The memory 71 may store one or more applications including program instructions that are executable by the processor 70. Such applications may include an operating system and various applications, such as a device control program 79 that controls various components of the edge device 60 including the input/output device(s) 73. The memory 71 may also tamper detection and prevention logic 80 that causes the processor 70 to receive input from the tamper detection sensor(s) 74 and execute a tamper prevention operation. Furthermore, the memory may include error/failure reporting logic 81 that causes the processor 70 to report errors or failures to the edge management computer 20 in FIG. 1. Still further, the memory or data storage device 71 may store data 82, which may be operational data describing the operation of the input/output device(s) 73 or other confidential data that should be protected against unauthorized access.

FIG. 4 is a diagram of a computer 100 that may be representative of the edge management computer 20 and/or one or more of the edge devices 40A-40N according to yet another embodiment. The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the computer 100 is able to communicate with other devices via the network 14 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. The hardware elements depicted in the computer 100 are not intended to be exhaustive, but rather are representative. For instance, the computer 100 may include non-volatile memory and the like.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. As shown, the computer 100 includes application programs 144 in the system memory of the computer 100, including, without limitation, a control program 145 including program instructions that may be executed by the processor 70 to cause the performance of various operations according to embodiments disclosed herein.

If the computer is used as an edge device, then the memory 144 may also store tamper detection and prevention logic 44, 80 and error/failure reporting logic 46, 81 as in the edge devices 40, 60 of FIGS. 2 and 3. The data 56 may be stored on the hard drive 134, which may be a self-encrypting drive. In some embodiments, the tamper detection and prevention logic 44, 80 may cause the edge device, such as computer 100, to perform tamper prevention operations, such as shutting down the edge device, automatically disabling a baseboard management controller (BMC) network bridge through up link ports, and automatically disabling the baseboard management controller network bridge through Wi-Fi Ports.

If the computer is the edge management computer 20, then the memory 144 may store (as shown) an authorized personnel database 22, edge device security settings 24, tamper detection management logic 26, and edge device error management logic 28. An identification badge scanner 32 or other identification devices 32 (see also FIG. 1) may be directly coupled to the computer 100 to support detection of personnel entering and exiting the facility.

The computer 100 may be a server having a baseboard management controller (BMC) 128 that monitors and/or controls operation of various of the other components of the computer 100. The baseboard management controller 128 is also able to communicate over the network 14 using the network interface 130.

Figure 5A:
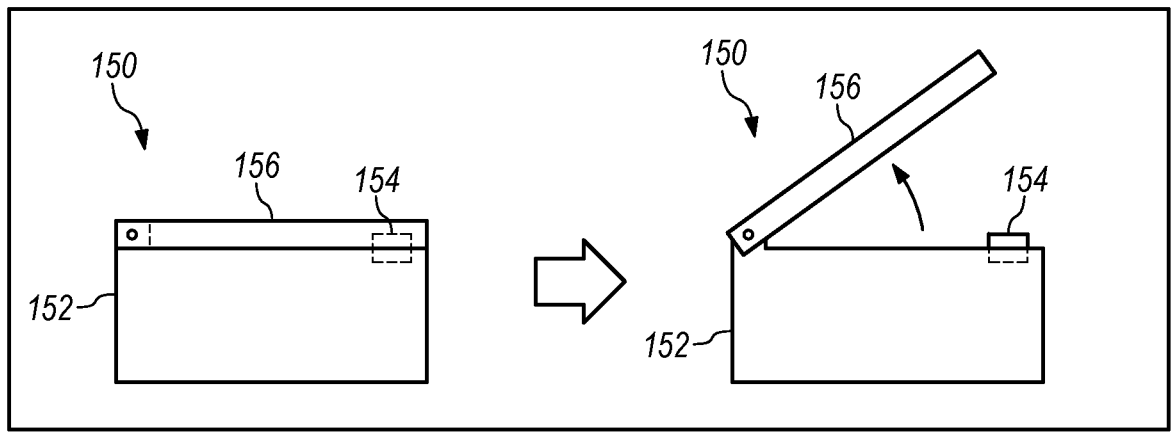
FIG. 5A is a diagram of an edge device having a chassis and an intrusion detection sensor that outputs a signal in response to a chassis lid moving from a closed position to an open position.

FIG. 5A is a diagram of an edge device 150 having a chassis 152 and an intrusion detection sensor 154 that outputs a signal in response to a chassis lid 156 moving from a closed position (as illustrated on the left) to an open position (as illustrated on the right).

Figure 5B:
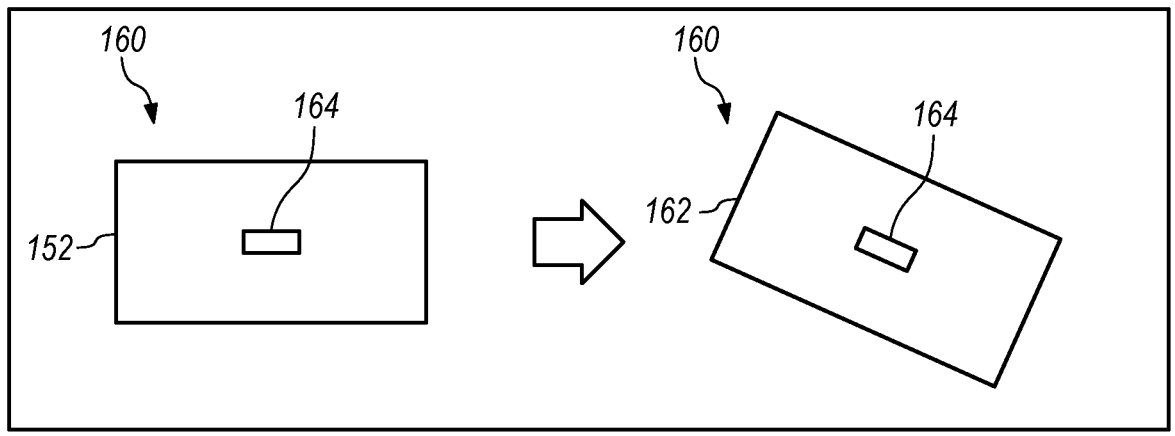
FIG. 5B is a diagram of an edge device having a chassis and a motion sensor that outputs a signal in response to movement of the chassis from a first orientation to a second orientation.

FIG. 5B is a diagram of an edge device 160 having a chassis 162 and a motion sensor 164 that outputs a signal in response to movement of the chassis 162 from a first, untampered orientation (as illustrated on the left) to a second, tampered orientation (as illustrated on the right). An untampered or predetermined orientation of the chassis 162 may be selected from a stand desktop, wall mount (horizontal), wall mount (vertical), bookshelf, or ceiling mount. Optionally, the tampered orientation may be any detectable orientation that is not the untampered or predetermined orientation.

Figure 5C:
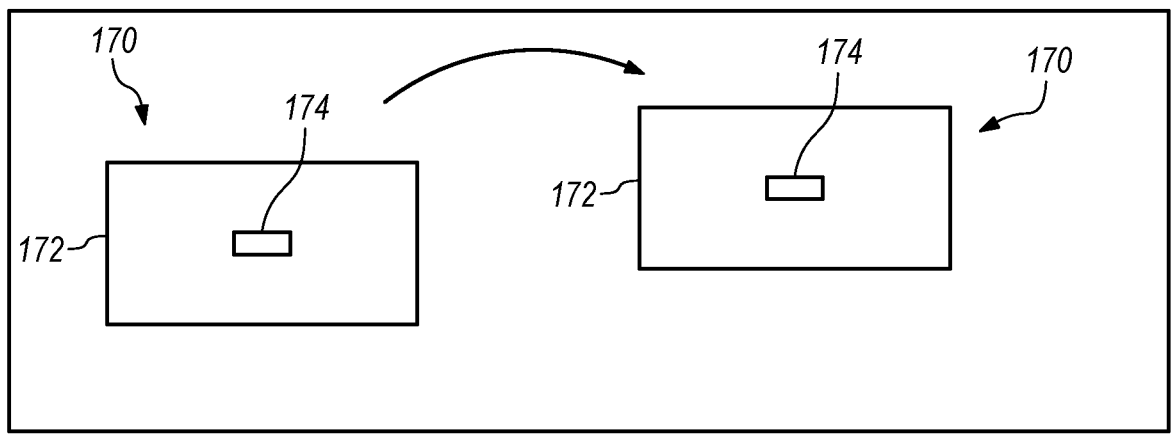
FIG. 5C is a diagram of an edge device having a chassis and a motion sensor that outputs a signal in response to movement of the chassis from a first location to a second location.

FIG. 5C is a diagram of an edge device 170 having a chassis 172 and a motion sensor 174 that outputs a signal in response to movement of the chassis 172 in the direction of the arrow 176 from a first location (as illustrated on the left) to a second location (as illustrated on the right).

Figure 6:
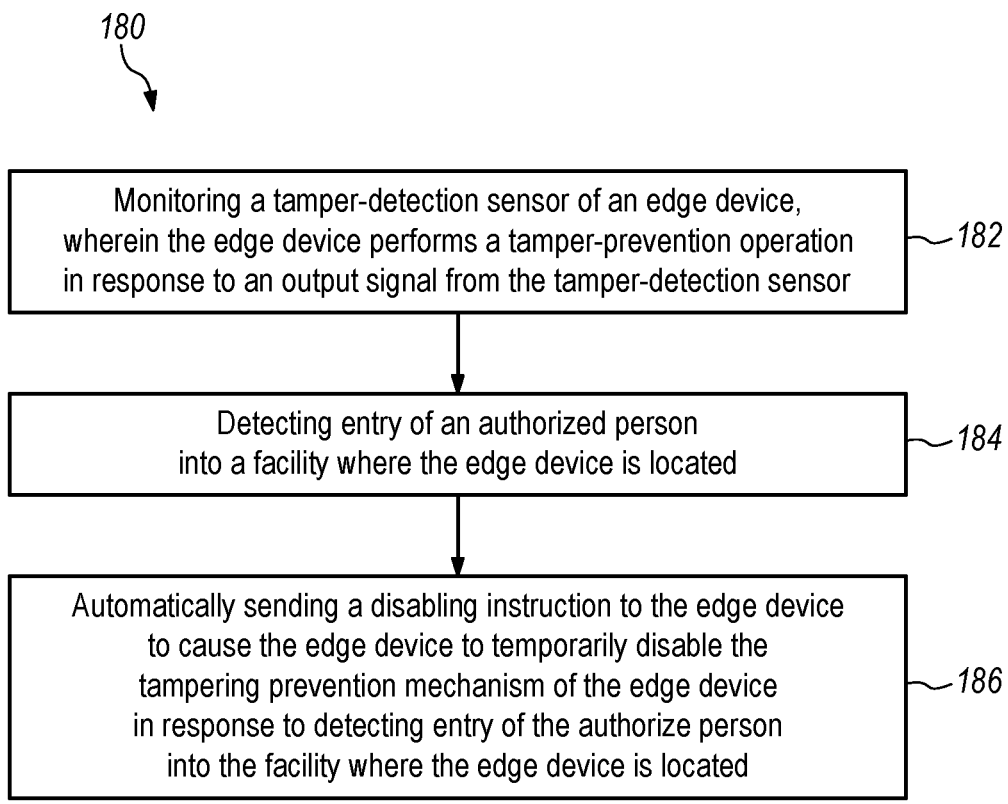
FIG. 6 is a flowchart of operations performed by the edge management system.

FIG. 6 is a flowchart of operations 180 performed by the edge management system. Operation 182 includes monitoring a tamper-detection sensor of an edge device, wherein the edge device performs a tamper-prevention operation in response to an output signal from the tamper-detection sensor. Operation 184 includes detecting entry of an authorized person into a facility where the edge device is located. Operation 186 includes automatically sending a disabling instruction to the edge device to cause the edge device to temporarily disable the tamper-prevention operation of the edge device in response to detecting entry of the authorized person into the facility where the edge device is located. The flowchart may further include additional operations according to further embodiments described herein.

In one non-limiting working example, an edge management system may have a security checkpoint where a security check or identification check is performed, such as an identification badge check, fingerprint recognition, facial recognition, retina scan, and the like. The edge management system may implement a pre-defined rule that when an authorized service person passes the security checkpoint, the edge management system will temporarily turn off (disable) the edge device tamper-detection and/or tamper prevention operation to allow the authorized service person to fix a problem with the edge device. After disabling the tamper-detection and/or tamper prevention operation, the tamper detection and prevention logic could again be enabled (i.e., re-enabled). For example, the tamper detection and prevention logic may be re-enabled after a certain period of time since disabling, such as one hour. As a separate example, the tamper detection and prevention logic may be re-enabled in response to the authorized service person passing the security check again as they exit the facility (an edge site) containing the edge device.

In this non-limiting working example, if the edge device experiences a problem such as a cooling fan failure, then the edge device may report a fan failure event to the edge management computer. The edge management computer may then send a notification regarding the fan failure event for the edge device to the authorized service person. When the authorized service person goes to the edge site to replace the fan, the authorized service person will pass through the edge site security checkpoint. An identification device at the security checkpoint may detect some identifying feature of the authorized service person, such that the edge management computer then sends a command to the edge device to temporarily turn off the edge device tamper-detection and/or tamper prevention operation. After the authorized service person replaces the edge device fan, the authorized service person will then pass through the edge site security checkpoint to exit the edge site. When the edge management computer detects that the authorized service person has swiped their identification badge or the identification device has performed facial recognition as the authorized service person is exiting the edge site (facility), or perhaps a timer reaches a tamper-detection disable timeout interval, then the edge management computer may send a command to the edge device to re-enable its tamper-detection and/or tamper prevention operation.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
monitoring a tamper-detection sensor of an edge device, wherein the edge device performs a tamper-prevention operation in response to an output signal from the tamper-detection sensor;
detecting entry of an authorized person into a facility where the edge device is located; and
automatically sending a disabling instruction to the edge device to cause the edge device to temporarily disable the tamper-prevention operation of the edge device in response to detecting entry of the authorized person into the facility where the edge device is located, wherein the tamper-prevention operation of the edge device includes performing a predetermined action to limit access to data stored by the edge device in response to an output signal from the tamper-detection sensor of the edge device indicating tampering with the edge device, and wherein the predetermined action is selected from triggering an automatic shutdown of the edge device, automatically disabling of a baseboard management controller network bridge through Up Link Ports, and/or automatically disabling the baseboard management controller network bridge through Wi-Fi Ports.

2. The computer program product of claim 1, wherein the disabling instruction commands the edge device to disable the tamper-prevention operation of the edge device for a predetermined period of time.

3. The computer program product of claim 1, wherein the tamper-prevention operation of the edge device further includes automatically preventing use of one or more component of the edge device in response to receiving the output signal from the tamper-detection sensor of the edge device that indicates tampering with the edge device.

4. The computer program product of claim 1, the operations further comprising:
detecting exit of the authorized person from the facility where the edge device is located; and
sending an enabling instruction to the edge device to enable the tamper-prevention operation of the edge device in response to detecting exit of the authorized person.

5. The computer program product of claim 1, the operations further comprising:
detecting completion of a service activity on the edge device; and
sending an enabling instruction to the edge device to enable the tamper-prevention operation of the edge device in response to detecting completion of a service activity on the edge device.

6. The computer program product of claim 1, the operations further comprising:
detecting expiration of a predetermined timeout period since disabling the tamper-prevention operation of the edge device; and
sending an enabling instruction to the edge device to enable the tamper-prevention operation of the edge device in response to detecting expiration of the predetermined timeout period.

7. The computer program product of claim 1, wherein detecting entry of the authorized person into the facility where the edge device is located includes detecting an identification badge of the authorized person.

8. The computer program product of claim 1, wherein detecting entry of the authorized person into the facility where the edge device is located includes receiving biometric input associated with the authorized person.

9. The computer program product of claim 1, the operations further comprising:
receiving a service alert from the edge device; and
sending a service request to the authorized person to perform a service task on the edge device in response to receiving the service alert.

10. The computer program product of claim 9, wherein the facility includes a plurality of edge devices, and wherein the disabling instruction is sent only to the edge device from which the service alert was received.

11. The computer program product of claim 1, wherein the tamper-detection sensor is an accelerometer integrated into the edge device to detect movement of the edge device.

12. The computer program product of claim 1, wherein the tamper-detection sensor is a physical intrusion sensor integrated into the edge device to detect opening of a chassis containing one or more components of the edge device.

13. The computer program product of claim 1, wherein the edge device is an edge computer including a self-encrypting data storage device.

14. The computer program product of claim 1, wherein the facility includes a plurality of edge devices, and wherein the disabling instruction is broadcast to each of the edge devices.

15. A computer program product comprising a non-volatile computer readable medium and non-transitory program instructions embodied therein, the program instructions being configured to be executable by a processor to cause the processor to perform operations comprising:
monitoring a tamper-detection sensor of an edge device, wherein the edge device performs a tamper-prevention operation in response to an output signal from the tamper-detection sensor, wherein the tamper-prevention operation of the edge device includes performing a predetermined action to limit access to data stored by the edge device in response to an output signal from the tamper-detection sensor of the edge device indicating tampering with the edge device;
detecting entry of an authorized person into a facility where the edge device is located;
automatically sending a disabling instruction to the edge device to cause the edge device to temporarily disable the tamper-prevention operation of the edge device in response to detecting entry of the authorized person into the facility where the edge device is located;
receiving user input designating a motion sensitivity level for the edge device; and
sending a setup instruction to the edge device to cause the edge device to implement the motion sensitivity level as a threshold for determining whether the output signal from the tamper-detection sensor on the edge device indicates tampering with the edge device.

16. The computer program product of claim 15, wherein the tamper-detection sensor is an accelerometer integrated into the edge device to detect movement of the edge device.

17. The computer program product of claim 15, wherein detecting entry of the authorized person into the facility where the edge device is located includes detecting an identification badge of the authorized person and/or receiving biometric input associated with the authorized person.

18. A computer program product comprising a non-volatile computer readable medium and non-transitory program instructions embodied therein, the program instructions being configured to be executable by a processor to cause the processor to perform operations comprising:

monitoring a tamper-detection sensor of an edge device, wherein the edge device performs a tamper-prevention operation in response to an output signal from the tamper-detection sensor, wherein the tamper-prevention operation of the edge device includes performing a predetermined action to limit access to data stored by the edge device in response to an output signal from the tamper-detection sensor of the edge device indicating tampering with the edge device;

detecting entry of an authorized person into a facility where the edge device is located;

automatically sending a disabling instruction to the edge device to cause the edge device to temporarily disable the tamper-prevention operation of the edge device in response to detecting entry of the authorized person into the facility where the edge device is located;

receiving user input designating a chassis orientation for the edge device; and sending a setup instruction to the edge device to cause the edge device to implement the chassis orientation as a configuration for determining whether the output signal from the tamper-detection sensor on the edge device indicates tampering with the edge device.

19. The computer program product of claim 18, wherein the tamper-detection sensor is an accelerometer integrated into the edge device to detect movement of the edge device.

20. The computer program product of claim 18, wherein detecting entry of the authorized person into the facility where the edge device is located includes detecting an identification badge of the authorized person and/or receiving biometric input associated with the authorized person.

\* \* \* \* \*